W. W. BROWER.
Stirrup.

No. 9,609. Reissued March 22, 1881.

Witnesses.
Chas. Wahlers.
William Miller

Inventor.
Wm. W. Brower
by Van Santvoord & Hauff
Attys.

N. PETERS, PHOTO-LITHOGRAPHER, WASHINGTON, D. C.

UNITED STATES PATENT OFFICE.

WILLIAM W. BROWER, OF NEW YORK, N. Y.

STIRRUP.

SPECIFICATION forming part of Reissued Letters Patent No. 9,609, dated March 22, 1881.

Original No. 223,577, dated January 13, 1880. Application for reissue filed January 4, 1881.

*To all whom it may concern:*

Be it known that I, WILLIAM W. BROWER, a citizen of the United States, residing at New York, in the county and State of New York, have invented a new and useful Improvement in Foot-Pads for Stirrups, &c., of which the following is a specification.

This invention is an improved article of manufacture, consisting of an india-rubber foot-pad provided with flexible metallic strips, for the purpose of attaching the pad to a stirrup. The attaching-strips are secured to the pad intermediate of its edges, thus adapting the pad to stirrups of different dimensions. In the edges of the pad are formed notches, serving to assist in holding the pad to its place.

This invention is illustrated in the accompanying drawing, in which—

Figure 1:
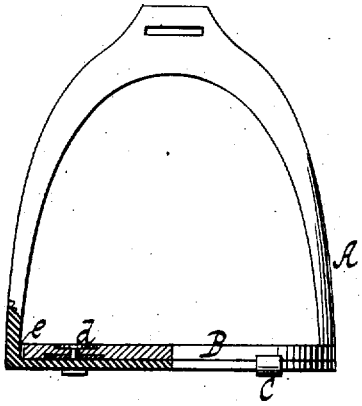
Figure 2:
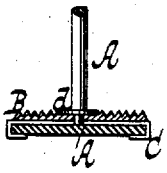
Figure 3:
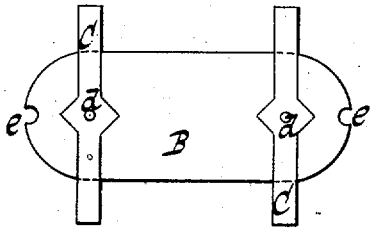

Figure 1 shows the pad, partly in side view and partly in section, applied to a stirrup. Fig. 2 is a cross-section thereof. Fig. 3 is an inverted plan view of the pad detached.

Similar letters indicate corresponding parts.

The letter A designates a stirrup having combined therewith a foot-pad, B, which is provided with flexible metallic attaching-strips C, according to my invention. The body of this pad B is made of india-rubber, and is usually shaped to cover the whole area of the article to which the pad is applied, so that the surface presented to the foot is one of rubber throughout. In order to increase the effect of the pad B, I roughen the top or bearing surface thereof, as shown in Fig. 2. The metallic strips C project from the pad B a sufficient distance to enable them to clasp the edges of the article to which the pad is applied, thereby firmly holding the pad in its position. These attaching-strips C are secured to the pad A intermediate of its edges—as, for example, at the middle of the pad—by rivets *d* or other suitable means, and by this arrangement the pad is adapted to stirrups of varrying widths or lengths.

The letter *e* designates notches formed in the edges of the pad B. These notches are used when the pad is applied to the stirrup A, and are intended to receive or embrace the side bars thereof, thus preventing lateral displacement of the pad.

What I claim as new, and desire to secure by Letters Patent, is—

1. An india-rubber foot-pad provided with flexible metallic attaching-strips, which are secured to the pad intermediate of its edges, for securing the pad in position, substantially as described.

2. An india-rubber foot-pad provided with the notches *e* in its edges, substantially as and for the purpose described.

3. An india-rubber foot-pad provided with flexible metallic attaching-strips C and the notches *e*, substantially as and for the purpose described.

In testimony that I claim the foregoing I have hereunto set my hand and seal this 29th day of December, 1880.

W. W. BROWER. [L. S.]

Witnesses:

W. HAUFF,

CHAS. WAHLERS.